US010215993B2

(12) United States Patent
Seung et al.

(10) Patent No.: US 10,215,993 B2
(45) Date of Patent: Feb. 26, 2019

(54) DISPLAY APPARATUS AND HOME APPLIANCES HAVING THE SAME

(71) Applicant: SAMSUNG ELECTRONICS CO., LTD., Suwon-si, Gyeonggi-do (KR)

(72) Inventors: Jung-ah Seung, Guri-si (KR); Jung-hun Lee, Yongin-si (KR); Tae-hyoung Cho, Seoul (KR); Mi-a Oh, Seongnam-si (KR); Kyoung-ae Lim, Seoul (KR); Hyun-il Lee, Seoul (KR); Sang-woon Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 102 days.

(21) Appl. No.: 15/220,746

(22) Filed: Jul. 27, 2016

(65) Prior Publication Data

US 2017/0059875 A1   Mar. 2, 2017

(30) Foreign Application Priority Data

Aug. 31, 2015   (KR) .................. 10-2015-0123145

(51) Int. Cl.
    *G02B 27/10*   (2006.01)
    *G02B 27/14*   (2006.01)
    (Continued)

(52) U.S. Cl.
    CPC ......... *G02B 27/144* (2013.01); *F25D 23/028* (2013.01); *F25D 29/005* (2013.01);
    (Continued)

(58) Field of Classification Search
    CPC ... G02B 27/144; G02B 1/14; G02F 1/133553; G02F 2201/50; G02F 2001/133557;
    (Continued)

(56) References Cited

U.S. PATENT DOCUMENTS 7,546,745 B2   6/2009   Lee et al.
8,018,645 B2   9/2011   Omote et al.
(Continued)

FOREIGN PATENT DOCUMENTS

CN   1783350    6/2006
CN   102998828   3/2013
(Continued)

OTHER PUBLICATIONS

Extended European Search Report dated Mar. 22, 2017 in related European Patent Application No. 16183071.6 (13 pages).
(Continued)

*Primary Examiner* — Joseph P Martinez
(74) *Attorney, Agent, or Firm* — Staas & Halsey LLP

(57) ABSTRACT

A display apparatus and a home appliance including the display apparatus are provided. The display apparatus includes a display unit, a transparent protection layer configured to be disposed on a front surface of the display unit and has a wider area than an area of the display unit, a half mirror layer configured to adhere onto a back surface of the transparent protection layer, reflect a portion of external light, and transmit light diffused from an image display area of the display unit, and a printing layer configured to be formed on a back surface of the half mirror layer and cover the display unit. A color of a background displayed in an image display area of the display unit in response to the display unit being turned on is equal to a color of the printing layer.

10 Claims, 21 Drawing Sheets

(51) Int. Cl.
*G02F 1/1335* (2006.01)
*G02B 1/14* (2015.01)
*F25D 23/02* (2006.01)
*F25D 29/00* (2006.01)
*G06F 3/044* (2006.01)
*G02F 1/1333* (2006.01)

(52) U.S. Cl.
CPC ......... *G02B 1/14* (2015.01); *G02F 1/133553* (2013.01); *G06F 3/044* (2013.01); *F25D 2323/021* (2013.01); *F25D 2400/361* (2013.01); *G02F 1/13338* (2013.01); *G02F 2001/13332* (2013.01); *G02F 2001/133331* (2013.01); *G02F 2001/133557* (2013.01); *G02F 2201/50* (2013.01)

(58) Field of Classification Search
CPC .......... G02F 2001/133331; G02F 2001/13332; G02F 1/13338
See application file for complete search history.

(56) References Cited

U.S. PATENT DOCUMENTS

| | | |
|---|---|---|
| 8,379,160 B2 | 2/2013 | Takenaka et al. |
| 8,692,943 B2 | 4/2014 | Tsuchihashi et al. |
| 2006/0118694 A1 | 6/2006 | Lee et al. |
| 2009/0258224 A1 | 10/2009 | Kawabe et al. |
| 2010/0208333 A1 | 8/2010 | Omote et al. |
| 2012/0026419 A1 | 2/2012 | Takenaka et al. |
| 2013/0063676 A1 | 3/2013 | Tsuchihashi et al. |
| 2013/0067375 A1* | 3/2013 | Kim ........................ F25D 29/00 715/769 |
| 2013/0242522 A1* | 9/2013 | Yoo ....................... H05K 5/0017 361/807 |
| 2014/0004331 A1 | 1/2014 | Hida et al. |
| 2014/0037843 A1 | 2/2014 | Satake et al. |
| 2015/0203970 A1 | 7/2015 | Mischel |
| 2015/0215911 A1 | 7/2015 | Dimou et al. |
| 2016/0026039 A1* | 1/2016 | Sakai ................ G02F 1/133555 345/1.3 |

FOREIGN PATENT DOCUMENTS

| | | |
|---|---|---|
| CN | 203455820 | 2/2014 |
| JP | 07-39905 B2 | 5/1995 |
| JP | 2011-071973 | 4/2011 |
| KR | 10-2008-0049836 A | 6/2008 |
| KR | 10-2010-0095274 A | 8/2010 |
| KR | 10-2011-0058303 A | 6/2011 |
| KR | 10-2012-0003437 A | 1/2012 |
| KR | 10-2014-0065155 A | 5/2014 |
| WO | WO 2009/008402 A1 | 1/2009 |
| WO | WO 2014/112525 A1 | 7/2014 |

OTHER PUBLICATIONS

European Search Report dated Dec. 20, 2016 in related European Patent Application No. 16183071.6 (7 pages).

Chinese Office Action dated Aug. 3, 2018 from Chinese Patent Application No. 201610685583.5, 17 pages.

* cited by examiner

DISPLAY APPARATUS AND HOME APPLIANCES HAVING THE SAME

CROSS-REFERENCE TO RELATED APPLICATIONS

This application claims priority from Korean Patent Application No. 10-2015-0123145, filed on Aug. 31, 2015, in the Korean Intellectual Property Office, the disclosure of which is incorporated herein by reference in its entirety.

BACKGROUND OF THE INVENTION

Field of the Invention

Apparatuses and methods consistent with the present invention relate to a display apparatus and A home appliance having the same, and more particularly, to a display apparatus that harmonizes with a design of a home appliance, and the home appliance having the same.

Description of the Related Art

Recent home appliances display setting states and operation states and partially apply a (touch type or non-touch type) display apparatus using a liquid crystal display (LCD) to all of the home appliances for manipulations of various and complicated menus.

However, if the LCD is partially applied to the home appliances as described above, a color of the LCD seen when the LCD is turned off is generally black and thus does not harmonizes with colors of the home appliances. Therefore, a whole contour of the LCD appears standing out, and thus the LCD does not harmonizes with whole designs of the home appliances, thereby lowering a percentage of completion of design.

In addition, existing home appliances are designed to turn off LCDs when not using the LCDs so as to minimize power consumption. However, if the LCDs of the home appliances are turned off, power of the home appliances are mistaken as being also turned off along with the LCDs.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus that may harmonize with a design of a home appliance even when being turned off, and the home appliance having the same.

The present invention also provides a display apparatus that may be arranged in a position arranged with at least one object included in a home appliance to harmonize with a design of the home appliance, and the home appliance having the same.

The present invention also provides a display apparatus that may have a size seen as extending and give a unity sense with a periphery when being turned on and/or off, and a home appliance having the same.

According to an aspect of the present invention, a display apparatus includes a display unit, a transparent protection layer configured to be disposed on a front surface of the display unit and have a wider area than an area of the display unit, a half mirror layer configured to adhere onto a back surface of the transparent protection layer, reflect a portion of external light, and transmit light diffused from an image display area of the display unit, and a printing layer configured to be formed on a back surface of the half mirror layer and cover the display unit. A color of a background displayed in the image display area of the display unit in response to the display unit being turned on may be equal to a color of the printing layer.

The color of the background displayed in the image display area of the display unit in response to the display unit being turned on may be equal to a color of the image display area of the display unit.

The printing layer may include a first area configured to expose the image display area of the display unit, and a second area configured to exclude the first area.

The second area may include a touch area where a capacitive touch key is disposed on a back surface of the printing layer. Masking parts indicating at least one images or symbols may be formed in the touch area.

The display apparatus may further include a light source configured to be disposed around the touch key so as to diffuse light to masking parts.

The half mirror layer may be a non-conductive film. The display apparatus may further include a transparent electrode layer configured to be disposed between the half mirror layer and the display unit so as to receive a touch input of a user and transmit the touch input to a controller.

The transparent protection layer may be formed of reinforced glass.

The half mirror layer may be formed in a size equal to a size of the transparent protection layer.

According to another aspect of the present invention, a home appliance includes a main body configured to include at least one object, and a display apparatus configured to be installed on a surface of the main body. The display apparatus may include a display unit, a transparent protection layer configured to be disposed on a front surface of the display unit and have a wider area than an area of the display unit, a half mirror layer configured to adhere onto a back surface of the transparent protection layer, and a printing layer configured to be formed on a back surface of the half mirror layer and cover the display unit, and wherein the display apparatus is arranged with at least one object.

At least a part of the display apparatus may be arranged with a part of the at least one object.

At least one side of the display apparatus may be positioned on a virtual straight line along with a side of the at least one object.

A color of the half mirror layer may be equal or similar to a color of the main body.

The half mirror layer may have light transmissivity between 65% and 85%.

A color of a background displayed in an image display area of the display unit being turned on, a color of the image display area of the display unit being turned off, and a color of the printing layer may be equal to one another.

According to another aspect of the present invention, a home appliance includes a main body configured to include a refrigerator compartment and a freezer compartment, a door configured to open and close the refrigerator compartment or the freezer compartment, and a grip configured to open and close the door, and a display apparatus configured to be installed on the door and include a part configured to be arranged with a part of the grip. The display apparatus may include a display unit, a transparent protection layer configured to be disposed on a front surface of the display unit and have a wider area than an area of the display unit, a half mirror layer configured to adhere onto a back surface of the transparent protection layer, and a printing layer configured to be formed on a back surface of the half mirror layer and cover the display unit. A color of the half mirror layer may be equal or similar to a color of the main body, and a color of a background displayed in an image display area of the display unit being turned on, a color of the image display area of the display unit being turned off, and a color of the printing layer may be equal to one another.

The main body may further include an additional door on which a dispenser is installed. Another part of the display apparatus may be arranged with a part of the dispenser.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the present invention will be more apparent by describing certain exemplary embodiments of the present invention with reference to the accompanying drawings, in which:

FIG. 5A is a front view of the display apparatus of FIG. 3 that is turned on;

DETAILED DESCRIPTION OF THE EXEMPLARY EMBODIMENTS

Figure 1:
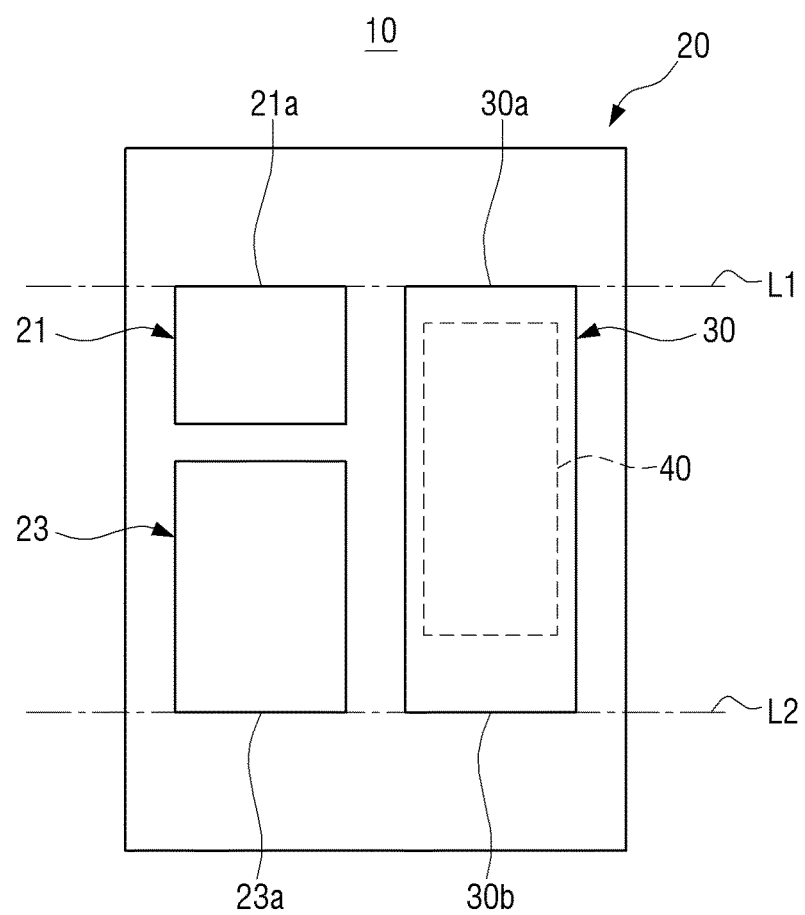
FIG. 1 is a front view of a home appliance including a display apparatus, according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Hereinafter, while various exemplary embodiments are capable of various modifications and alternative forms, embodiments thereof are shown by way of example in the drawings and will herein be described in detail. It may be understood, however, that there is no intent to limit exemplary embodiments to the particular forms disclosed, but on the contrary, exemplary embodiments are to cover all modifications, equivalents, and alternatives falling within the scope of the invention. Like numbers refer to like elements throughout the description of the figures.

Although the terms, 'first', 'second', etc. may be used herein to describe various elements regardless of orders and/or importances, these elements may not be limited by these terms. These terms are only used to distinguish one element from another. For example, a first user device and a second user device may indicate different user devices regardless of orders or importances. For example, a first element may be termed a second element, and, similarly, a second element may be termed a first element, without departing from the scope of exemplary embodiments.

The terminology used herein is for the purpose of describing particular embodiments only and is not intended to be limiting of exemplary embodiments. As used herein, the singular forms are intended to include the plural forms as well, unless the context clearly indicates otherwise. Unless otherwise defined, all terms (including technical and scientific terms) used herein have the same meaning as commonly understood by one of ordinary skill in the art to which example embodiments belong. It will be further understood that terms, such as those defined in commonly used dictionaries, may be interpreted as having a meaning that is consistent with their meaning in the context of the relevant art and will not be interpreted in an idealized or overly formal sense unless expressly so defined herein. The terminology defined herein may not be interpreted as excluding exemplary embodiments of the present disclosure.

FIG. 1 is a front view of a home appliance 10 including a display apparatus 30, according to an exemplary embodiment of the present invention.

Referring to FIG. 1, the home appliance 10 according to the present exemplary embodiment may be one of home appliances such as a refrigerator, an air conditioner, a washer, an air cleaner, a laundry dryer, etc. The home appliance 10 may include a main body 20 and the display apparatus 30.

The main body 20 may include first and second objects 21 and 23 included on an external appearance of the main body 20 or may include merely a single object. In this case, the first and second objects 21 and 23 may be one of various types of components (e.g., a dispenser, a manipulation panel, a grip, a window, etc.). The first and second objects 21 and 23 may be disposed on upper and lower part at a preset distance from each other and may have the same widths.

The display apparatus 30 may be arranged in a position arranged along with the first and second objects 21 and 23 of the main body 20 so as to enable a display unit 37 (e.g., a liquid crystal display (LCD) panel), which will be described later, to naturally harmonize with a whole design of the home appliance 10 or a design of the main body 20. Here, the "design" may be defined in consideration of a combination of one or at least two or more of a shape, a form, and a color of the home appliance 10.

As illustrated in FIG. 1, the position where the display apparatus 30 is arranged may be a position where an upper end 30a of the display apparatus 30 is arranged on a first virtual straight line L1 along with an upper end 21a of the first object 21, and a lower end 30b of the display apparatus 30 is arranged at a distance from the first object 21 on a second virtual straight line L2 along with a lower end 23a of the second object 23. In this case, the first and second virtual straight lines L1 and L2 may be disposed to be parallel with each other. The upper end 30a and the lower end 30b of the display apparatus 30 may be an upper end 31a and a lower end 31b of a transparent projection layer 31 that will be respectively described later.

Although not shown in FIG. 1, the display apparatus 30 may be arranged with merely one of the first and second objects 21 and 23.

Figure 2:
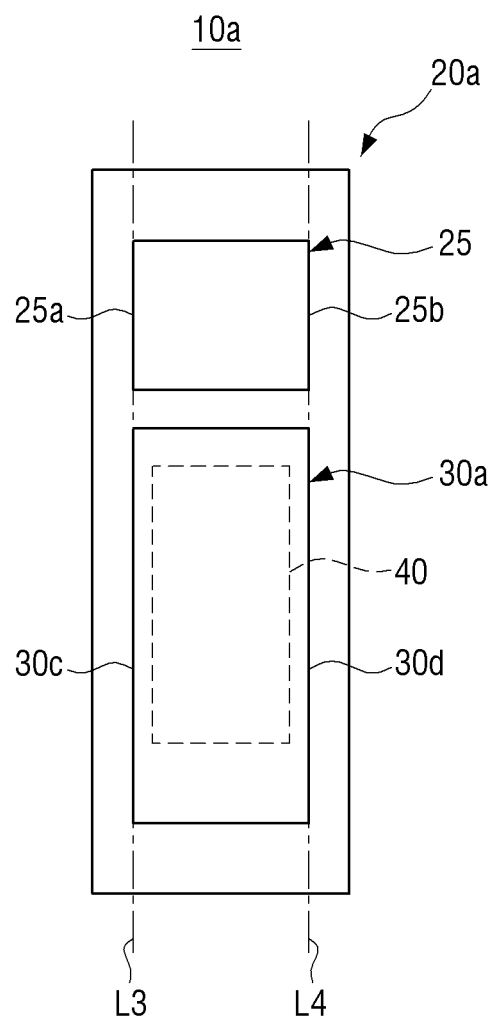
FIG. 2 is a front view of a display apparatus that is arranged to harmonize with a single object included in a main body of a home appliance having a different design from the home appliance of FIG. 1, according to an exemplary embodiment of the present invention.

FIG. 2 is a front view of a display apparatus 30 that is arranged in a home appliance 10a having a different design from the home appliance 10 of FIG. 1 to harmonize with a single object 25 included on a main body 20a of the home appliance 10a, according to an exemplary embodiment of the present invention.

Referring to FIG. 2, if the single object 25 is included on the main body 20a of the home appliance 10a, the display apparatus 30 may be arranged in a position arranged along with the single object 25.

In other words, the display apparatus 30 may be arranged at a preset distance from a lower end of the single object 25 and may be arranged so as to enable a left end 30c of the display apparatus 30 to be positioned on a third virtual straight line L3 along with a left end 25a of the single object 25 and enable a right end 30d of the display apparatus 30 to be poisoned on a fourth virtual straight line L4 along with a right end 25b of the single object 25.

According to the exemplary embodiments described above, the display apparatus 30 may be arranged with objects included on the main body 20 or 20a to harmonize with a design of the main body 20 or 20a so as to provide stability. For this, at least a part of the display apparatus 30 may be arranged along with a part of an object or at least a side of the display apparatus 30 may be positioned on the same virtual straight line along with the object.

A half mirror layer 33, which will be described later, may be included to have the same color as or a similar color to a color of a main body of the display apparatus 30 so as to provide a harmonization with a design of the main body 20 or 20a. When a display unit 37 of the display apparatus 30 that will be described later is turned off, the half mirror layer 33 may cover the display unit 37, and the display apparatus 30 may have the same color as or a similar color to a color of the main body 20 or 20a, thereby providing a unity sense with the main body 20 or 20a. In addition, the display apparatus 30 may keep a color of a printing layer 35, which will be described later, equal to a color of an image display area of the display unit 37 so as to enable a user not to recognize a contour of the display apparatus 30 when the display unit 37 is turned on and/or off. This may enable the display apparatus 30 including a plurality of components to provide a visual unity sense and enable a display unit to look like enlarged.

A configuration of the display apparatus 30 that has been described above will now be described in detail with reference to FIGS. 3 through 5B.

Figure 3:
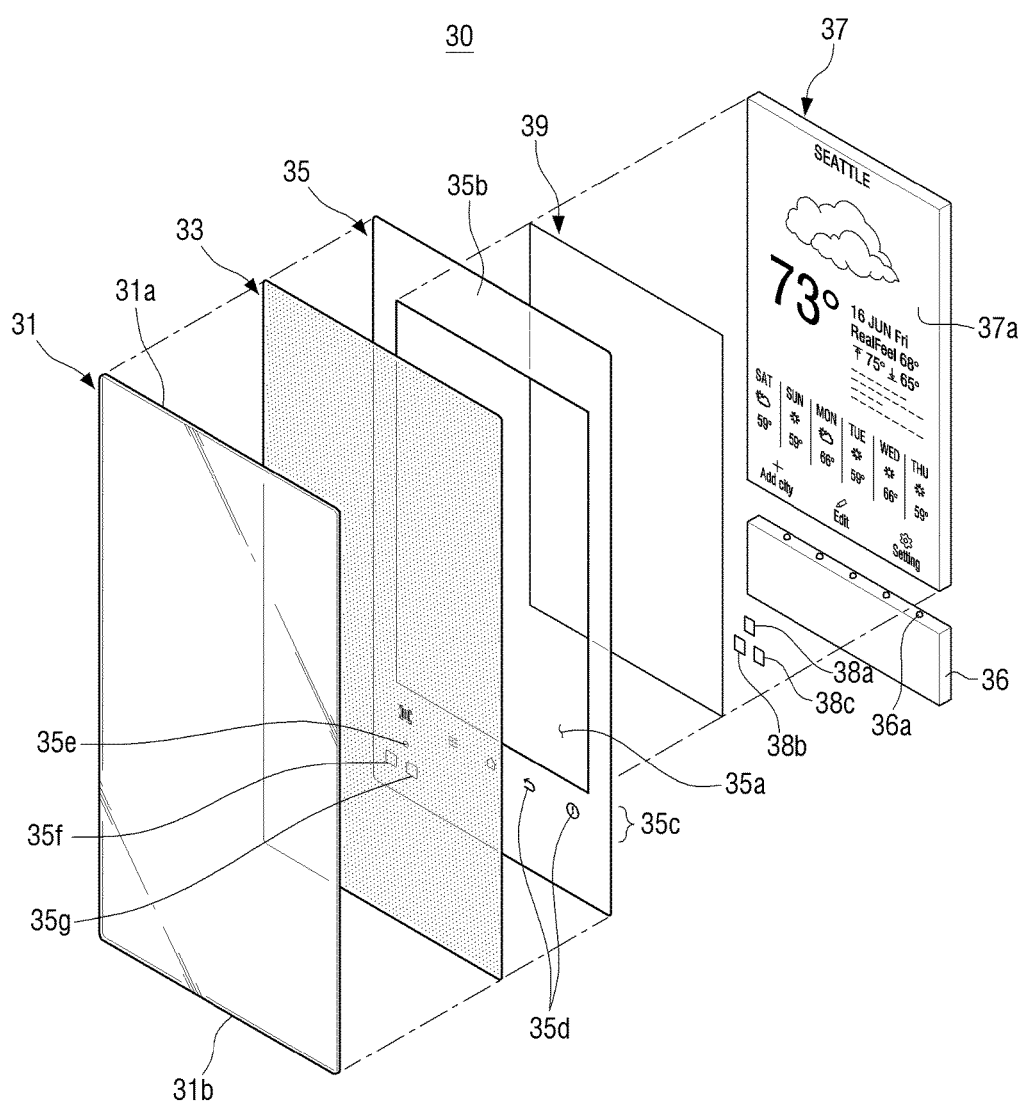
FIG. 3 is a schematic exploded view of a display apparatus, according to an exemplary embodiment of the present invention.
Figure 4:
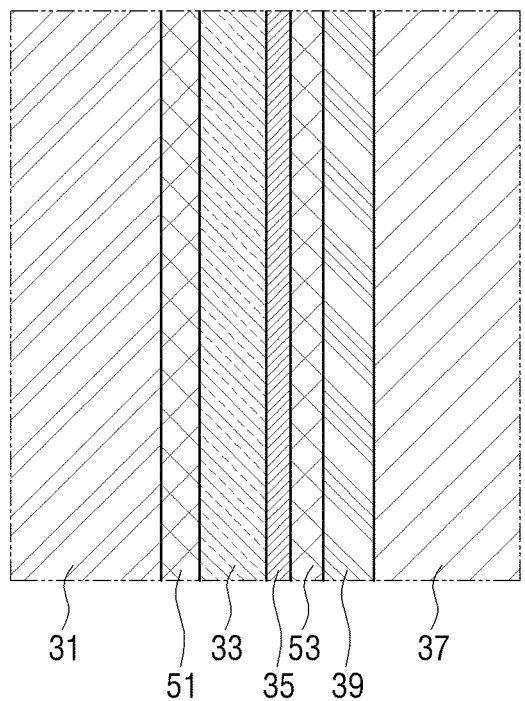
FIG. 4 is an enlarged cross-sectional view of a part of a stack structure of the display apparatus of FIG. 3.
Figure 5A:
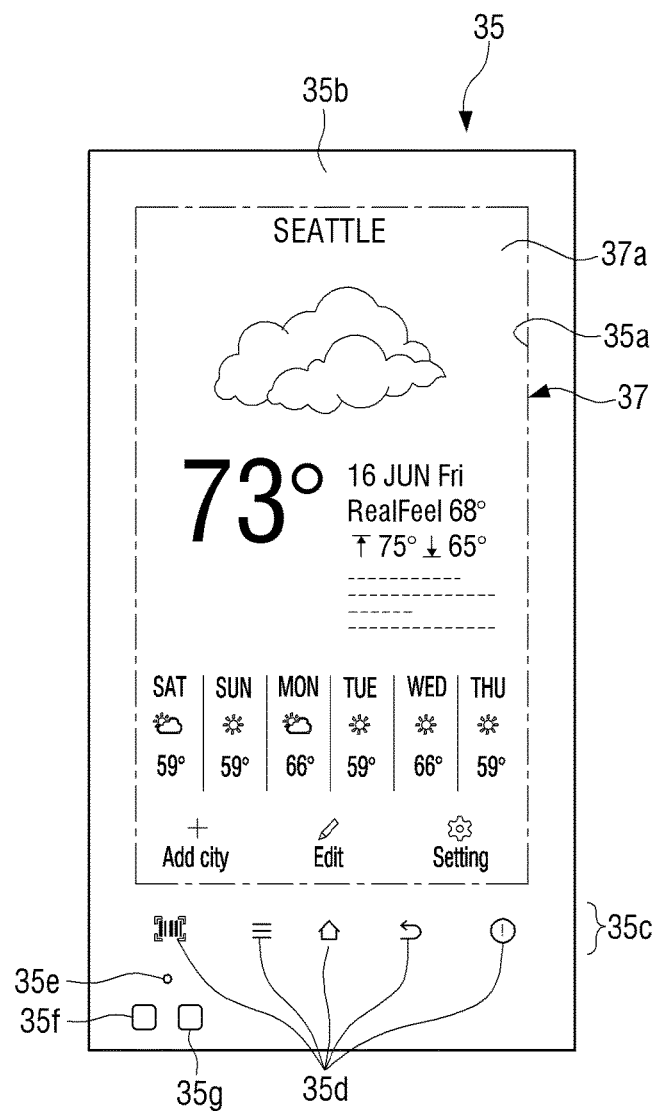
Figure 5B:
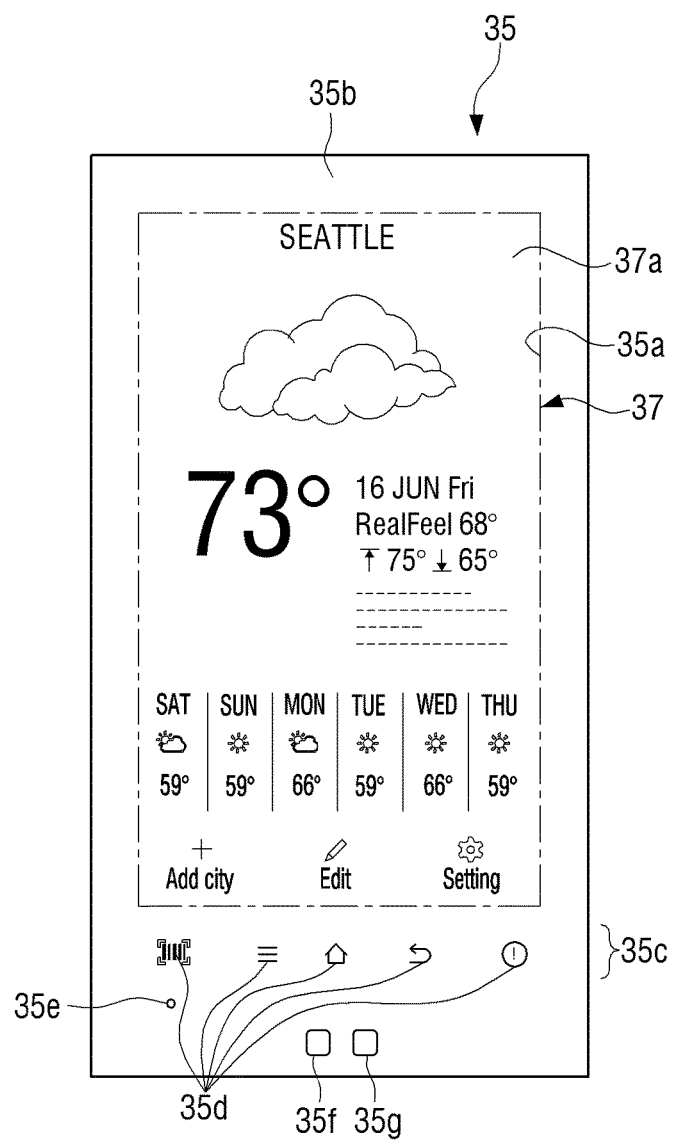
FIG. 5B illustrates first and second holes that are used for left and/or right proximity sensors and disposed in a center of a printing layer, according to an exemplary embodiment of the present invention.

FIG. 3 is a schematic exploded view of a display apparatus 30, according to an exemplary embodiment of the present invention. FIG. 4 is a cross-sectional view of an enlarged part of a stack structure of the display apparatus 30 of FIG. 3. FIG. 5A is a front view of the display apparatus 30 of FIG. 3 that is turned on. FIG. 5B illustrates first and second holes used for left and/or right proximity sensors that are disposed in a center of a printing layer, according to an exemplary embodiment of the present invention.

Referring to FIG. 3, the display apparatus 30 may include a transparent protection layer 31 formed of reinforced glass, the half mirror layer 33, the printing layer 35, the display unit 37, and a transparent electrode layer 39.

Referring to FIG. 4, the display apparatus 30 may be formed by sequentially stacking the transparent protection layer 31, the half mirror layer 33, the printing layer 35, the transparent electrode layer 39, and the display unit 37. In this case, the transparent protection layer 31 and the half mirror layer 33 may adhere to each other through a first adhesive film 51 (e.g., an optically clear adhesive (OCA)). Also, the half mirror layer 33 having a back surface on which the half mirror layer 33 is formed may adhere to the display unit 37 having a front surface on which the transparent electrode layer 39 is formed, through a second adhesive film 53 (e.g., an OCA).

Elements of the display apparatus 30 will now be sequentially described.

The transparent protection layer 31 may be formed of the reinforced glass and may be disposed in front of the display unit 37 so as to protect the display unit 37 from an external impact.

The half mirror layer 33 may be formed in the same size as that of the transparent protection layer 31. The half mirror layer 33 may be formed of an optical PET film laminated with an anti-scattering film for protecting scattering of glass pieces when reinforce glass is broken.

Metal, such as aluminium (Al), nickel (Ni), titanium (Ti), or the like, may be deposited in an ultra-thin film form on a surface of the half mirror layer 33 so as to enable the half mirror layer 33 to have preset light transmissivity. In this case, the light transmissivity of the half mirror layer 33 may be in a range between 65% and 85%. If the light transmissivity of the half mirror layer 33 is lower than 65%, a definition of an image displayed in an image display area 37a of the display unit 37 may be lowered. If the light transmissivity of the half mirror layer 33 exceeds 85%, the display unit 37 may not be efficiently covered when being turned off.

The half mirror layer 33 has the same reflectivity as a general mirror and transmits light diffused from a light source that is disposed in the rear of the half mirror layer 33 and has preset brightness, i.e., from the display unit 37, so as to enable an image displayed on the display unit 37 to be seen clearly through the half mirror layer 33. Therefore, when the display unit 37 is turned on, the half mirror layer 33 may transmit light diffused from the image display area 37a of the display unit 37 so as to enable the user to sufficiently recognize the image.

Also, when the display unit 37 is turned off, the half mirror layer 33 may reflect light to perform a mirror function and cover the display unit 37. In addition, the half mirror layer 33 may be formed in the same color as or a similar color to a color of the main body 20 formed of a metal material not to provide a difference sense from the main body 20 but to provide a unity sense of being recognized as a single entity along with the main body 20 so as to naturally harmonize with the main body 20. Therefore, although the display unit 37 is turned off, the display unit 37 may not be seen, and a color of the half mirror layer 33 may be the same as or harmonize with a color of the main body 20. As a result, although the display unit 37 is turned off, the user may not feel that a whole part of the home appliance 10 is turned off.

The printing layer 35 may be formed on a back surface of the half mirror layer 33 through printing processing. The printing layer 35 is formed so as to cover the display unit 37. For example, the printing layer 35 may include a first area 35a exposing the display unit 37 and a second area 35b excluding the first area 35a.

The first area 35a of the printing layer 35 is an area that has a size corresponding to a size of the display unit 37 and where printing is not performed so as not to cover the display unit 37. The second area 35b of the printing layer 35 is formed along a border (or an edge) of the half mirror layer 33.

In this case, the second area 35b of the printing layer 35 may have a preset color and may have the same color as a color of the image display area of the display unit 37 when the display unit 37 is turned off. Therefore, since the display unit 37 and the printing layer 35 is not distinguished from each other, the user may visually feel that a size of the display unit 37 extends to the second area 35b of the printing layer 35.

Also, a color of the printing layer 35 may be the same as a background color of a GUI displayed in the image display area of the display unit 37 when the display unit 37 is turned on. This may enable a background of the GUI and the second area 35b of the printing layer 35 not to be visually distinguished when the GUI is displayed in the image display area of the display unit 37, so as to enable a contour of the display unit 37 not to be seen. Therefore, even when the display unit 37 is turned on, this may give a feeling of that a whole area of the display unit 37 extends to the second area 35b of the printing layer 35 like when the display unit 37 is turned off as described above.

The color of the printing layer 35, a color of the image display area 37a of the display unit 37 when the display unit 37 is turned off, and the background color of the GUI displayed in the image display area 37a of the display unit 37 may be all the same so as to enable the printing layer 35 and the display unit 37 to always have homogeneity when the display unit 37 is turned on and/or off.

Referring to FIG. 3, a touch key 36 may be disposed at a back of the printing layer 35 corresponding to a part of the second area 35b, i.e., a touch area 35c adjacent to a lower end of the first area 35a.

The touch key 36 may be a capacitive touch sensor capable of sensing a touch input of the user, and masking parts 35d indicating at least one images or symbols may be formed in the touch area 35c. If the user touches an area corresponding to each of the masking parts 35d, the touch key 36 may perform a preset function with respect to the corresponding masking unit 35d. For example, if the user touches the masking part 35d, the touch key 35 may sense this touch to control the GUI displayed in the image display area 37a of the display unit 37.

At least one light sources 36a (e.g., a light-emitting diode (LED) module) may be disposed around the touch key 36 to diffuse light to the masking parts 35d so as to enable the user to easily recognize the masking parts 35d with eyes.

Also, a first hole 35e through which light is incident into a camera 38a may be formed in a left side of a lower part of the touch area 35c, and a second hole 35f and a third hole 35g respectively used for left and right proximity sensors 38b and 38c may be formed under the first hole 35e. Referring to FIG. 5B, the second and third holes 35f and 35g may also be formed in a center of the lower part of the touch area 35c. In this case, the left and right proximity sensors 38b and 38c may also be set in positions respectively corresponding to the second and third holes 35f and 35g.

The display unit 37 may have a smaller size than the transparent protection layer 31 and the half mirror layer 33. For example, if the display unit 37 has a size of 21.5 inches, the transparent protection layer 31 and the half mirror layer 33 may each have a size of about 30 inches.

Also, the display unit 37 may have the same size as a size of the first area 35a of the printing layer 35 as described above, and a contour of the display unit 37 may correspond to a contour of the first area 35a of the printing layer 35. Therefore, when the display unit 37a is turned on, and thus the GUI is displayed in the image display area 37a as shown in FIG. 5A, a background color of the GUI is the same as a color of the printing layer 35. Therefore, the display unit 37 and the second area 35b of the printing layer 35 may not be distinguished from each other, and thus the size of the display unit 37 may be recognized as a size including the second area 35b of the printing layer 35.

Figure 6A:
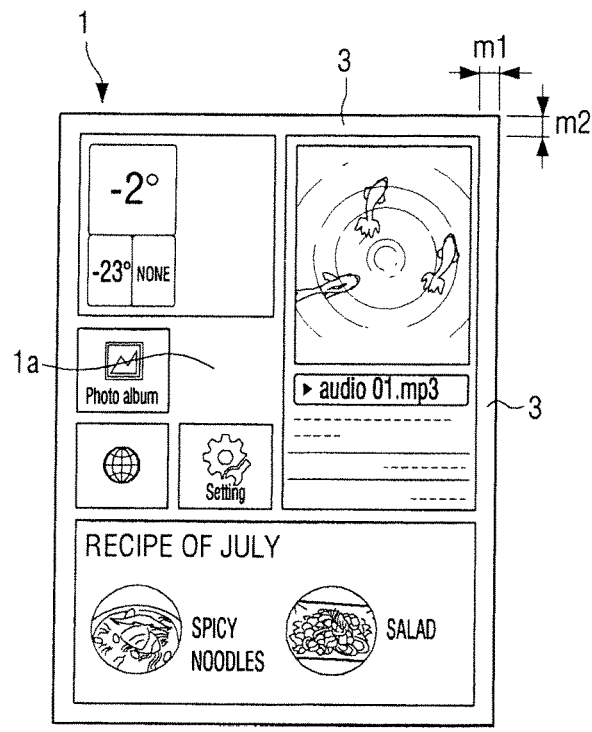
FIGS. 6A and 6B illustrate a comparison between a range of an image display area of a display apparatus of an exemplary embodiment of the present invention and a range of an image display area of a general display apparatus.
Figure 6B:
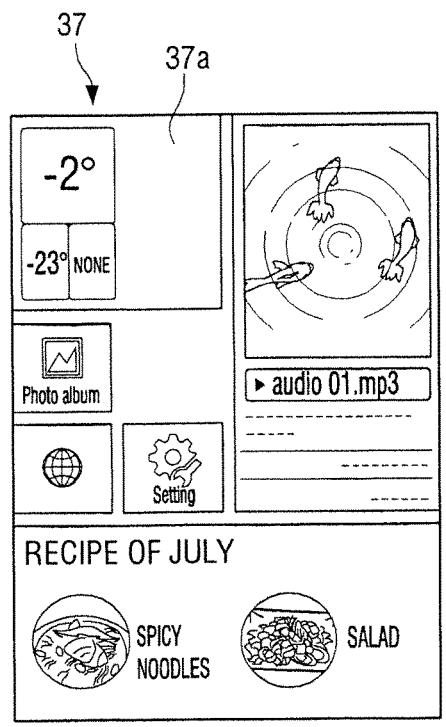

FIGS. 6A and 6B illustrate a comparison between a range of an image display area of a display apparatus of an exemplary embodiment of the present invention and a range of an image display area of a general display apparatus.

Since a boundary of the display unit 37 with the printing layer 35 is not seen as described above, a margin may not be provided at an edge part of the display unit 37 as shown in FIG. 6B, and thus a real use area of the image display area 37a may be maximized.

On the contrary to this, if an existing display unit 1 applied to a home appliance displays an image to a contour as shown in FIG. 6A, a boundary between a main body of the home appliance and the display unit 1 may be too clearly exposed, and thus the display unit 1 may be visually unstable and disharmonize with a whole design. Therefore, preset margins m1 and m2 may be set at an edge of the display unit 1, and a non-image display area that does not display an image may be provided by these margins m1 and m2. As a result, a size of an image display area of the display unit 1 is reduced more than a size of an image display area of the display unit 37 of the present invention.

The transparent electrode layer 39 may be formed of an Indium Tin Oxide (ITO) film. The transparent electrode layer 39 is a sensor that has a conductivity to measure a capacitance of a touch input of a user so as to find input coordinates. The transparent electrode layer 39 may include a sensing layer and a driving layer stacked on the sensing layer. The transparent electrode layer 39 may detect the touch input performed by the user due to a non-conductivity characteristic of the half mirror layer 33, and the image display area 37a of the display unit 37 may operate by this touch input.

Hereinafter, a home appliance of the present invention will be described as being restricted to a refrigerator 100 so as to emphatically describe an arrangement of a display apparatus 30 with objects (e.g., a grip 132 and a dispenser 150 of a door) included in a refrigerator 100. In addition, the display apparatus 30 that will be mentioned later has the same configuration as the display apparatus 30 described above, and thus a detailed description of the configuration of the display apparatus 30 is omitted.

Figure 7:
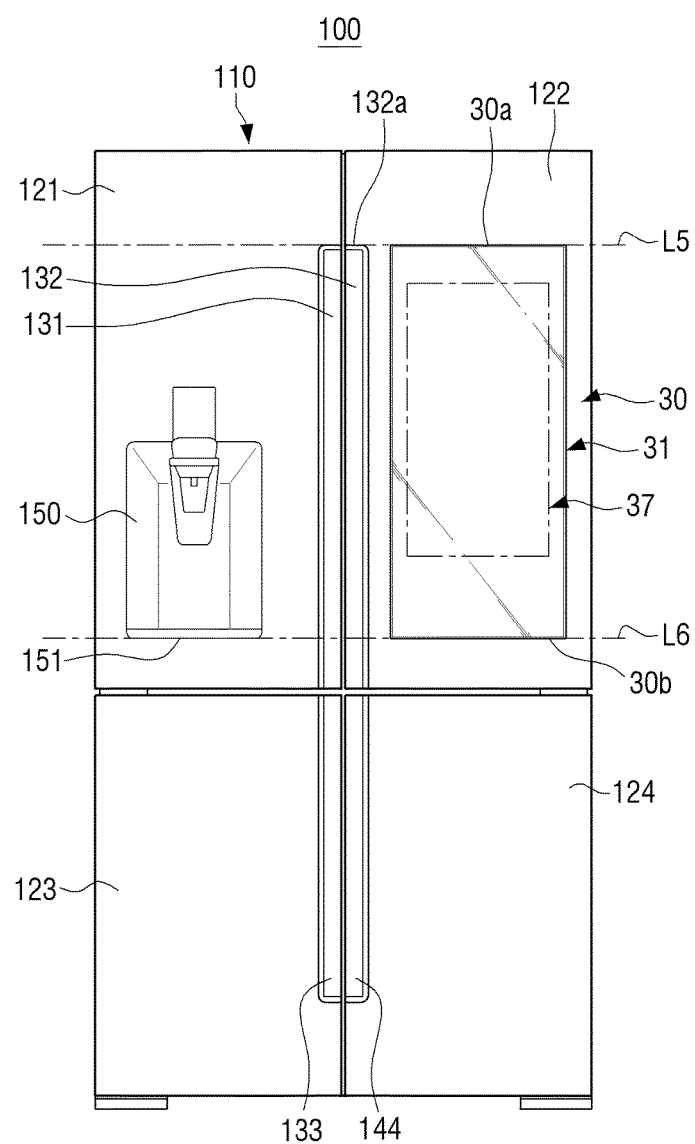
FIG. 7 is a front view of a refrigerator including a display apparatus that is turned off so as not to display a graphical user interface (GUI) in an image display area, according to an exemplary embodiment of the present invention.

FIG. 7 is a front view of the refrigerator 100 including the display apparatus 30, i.e., illustrates the display apparatus 30 that is turned off not to display a GUI in an image display area, according to an exemplary embodiment of the present invention.

Referring to FIG. 7, the refrigerator 100 of the present exemplary embodiment may include a plurality of refrigerator compartments and a plurality of freezer compartments, and a plurality of doors 121, 122, 123, and 124 may be included to respectively open and close the refrigerator compartments and the freezer compartments.

The doors 121, 122, 123, and 124 respectively include grips 131, 132, 133, and 134 so as to enable a user to open and close the doors 121, 122, 123, and 124. In this case, a pair of grips 131 and 132 may be disposed to be symmetrical to each other at a pair of doors 121 and 122 disposed on left and/or right sides of an upper part of the refrigerator 100. Also, a pair of grips 133 and 134 may be disposed to be symmetrical to each other at a pair of doors 123 and 124 disposed on left and/or right sides of a lower part of the refrigerator 100. In addition, the dispenser 150 may be disposed at the door 121 disposed on the left side of the upper part.

The display apparatus 30 may be disposed on the door 122 disposed on the right side of the upper part. In this case, the display apparatus 30 may be disposed to be arranged with the grip 132 of the door 122 disposed on the right side of the upper part and the dispenser 150. In other words, an upper end 30a of the display apparatus 30 may be disposed to be positioned on a fifth virtual straight line L5 along with an upper end 132a of the grip 132. Also, a lower end 30b of the display apparatus 30 may be disposed to be positioned on a sixth virtual straight line L6 along with a lower end 151 of the dispenser 150. In this case, the fifth and sixth virtual straight lines L5 and L6 may be disposed to be parallel with each other. Here, the upper end 30a and the lower end 30b of the display apparatus 30 may be the same as an upper end 31a and a lower end 31b of a transparent protection layer 31.

As described above, the display apparatus 30 may be disposed to be simultaneously arranged with a plurality of objects (e.g., the grip 132 and the dispenser 150) but is not limited thereto. Therefore, the display apparatus 30 may be arranged with merely one of the grip 132 and the dispenser 150.

As illustrated in FIG. 7, a display unit 37 of the display apparatus 30 is turned off. If the display unit 37 is turned off, the display unit 370 may have the same color as or a similar color to a color of a main body 110 and thus may be naturally covered by the half mirror layer 33. Also, the display apparatus 30 may give a harmonization with the main body 110 to harmonize with a design of the main body 110 or a whole design of the refrigerator 100 so as to give an aesthetic sense to the user.

Figure 8:
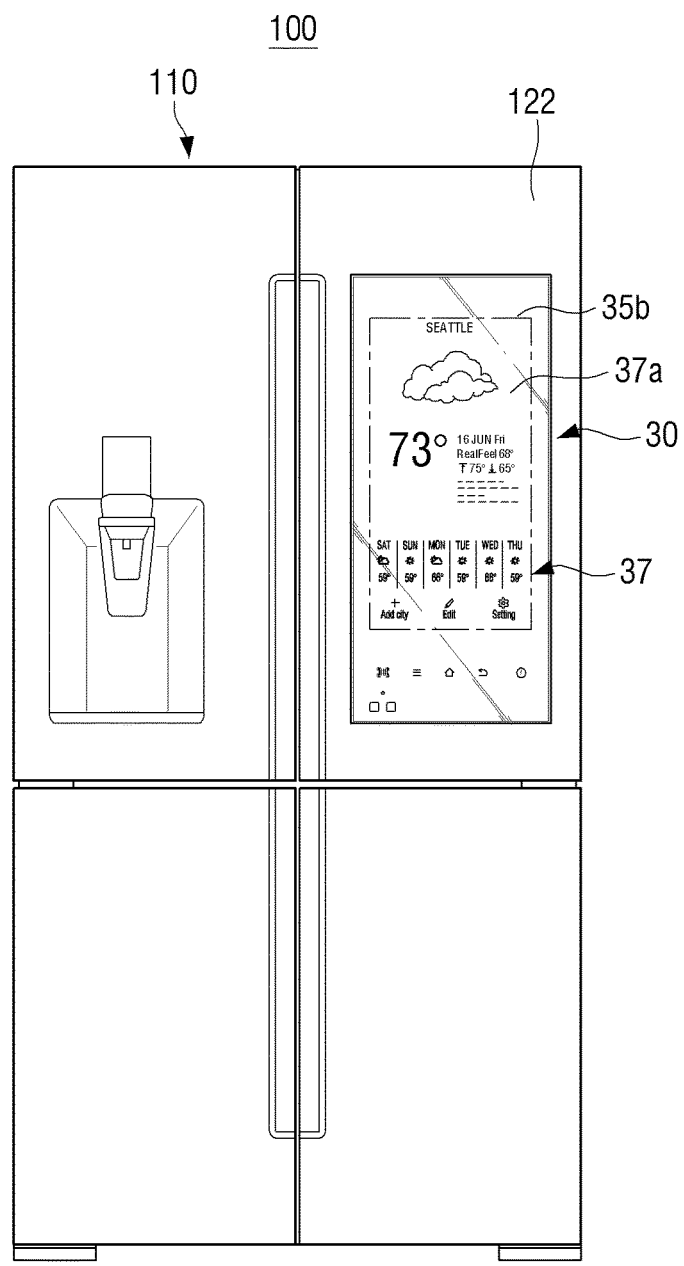
FIG. 8 illustrates a display apparatus that is turned on so as to display a GUI in an image display area, according to an exemplary embodiment of the present invention.

FIG. 8 illustrates a display apparatus 37 that is turned on to display a GUI in an image display area, according to an exemplary embodiment of the present invention.

Referring to FIG. 8, when the display unit 37 of a display apparatus 30 is turned on, a color of a background displayed in an image display area 37a of the display unit 37 is the same as a color of a second area 35b of the printing layer 35 printed on a back surface of the half mirror layer 33, and thus a boundary between the display apparatus 30 and the printing layer 35 is not visually easily checked. Therefore, the display apparatus 30 may provide the display unit 37, which has a smaller size than a whole size of the display apparatus 30 (or a size of the transparent protection layer 31 or a size of the half mirror layer 33), with an effect of being seen as extending in a size corresponding to the whole size of the display apparatus 30.

Figure 9:
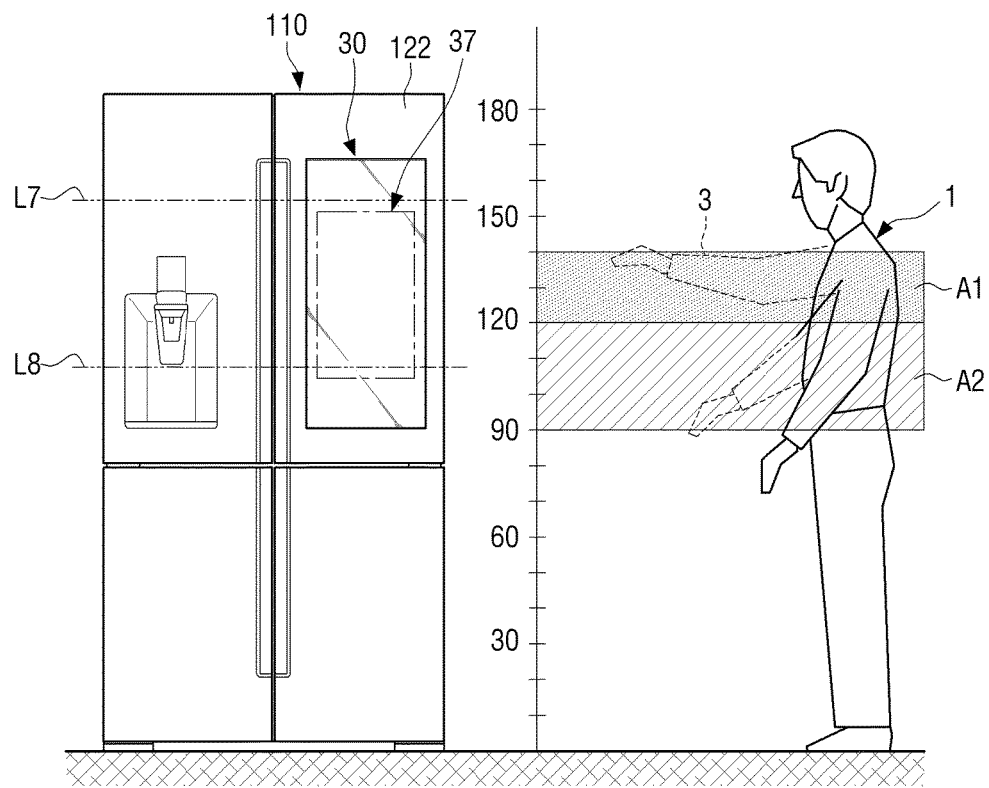
FIG. 9 illustrates a display unit of a display apparatus that is installed on a door of a refrigerator in a height easily accessed by a user, according to an exemplary embodiment of the present invention.

FIG. 9 illustrates a display unit 37 of a display apparatus 30 that is installed at a door of a refrigerator at a height easily accessed by a user, according to an exemplary embodiment of the present invention.

Referring to FIG. 9, the display unit 37 may be disposed in an arrangement area of the display apparatus 30 easily accessible when a user 1 raises an arm 3. For example, when the display unit 37 is based on an adult user, a height of the display unit 37 may be on a level enough to correspond to a range between about 90 cm and about 140 cm from the ground. In this case, the height of the display unit 37 may be disposed so as to correspond to the range between about 120 cm and about 140 cm. Therefore, the display unit 37 may be disposed between a seventh virtual straight line L7 of FIG. 9 and a eighth virtual straight line L8 of FIG. 9 lower than the seventh virtual straight line L7.

Figure 10:
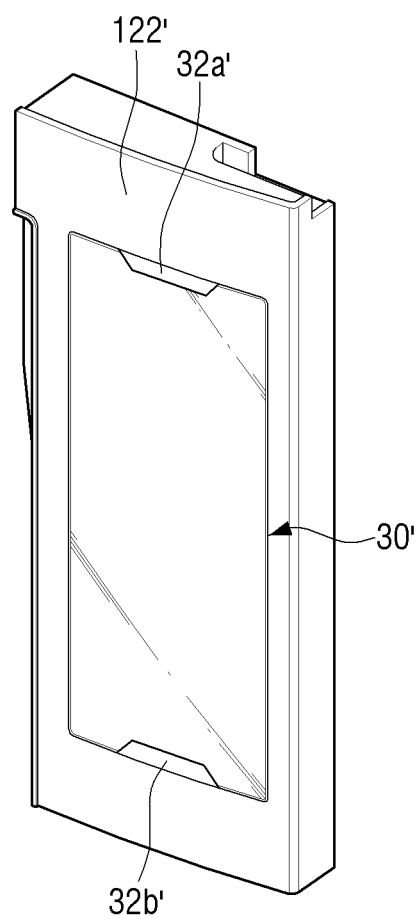
FIG. 10 is a perspective view of proximity sensors that are disposed at upper and lower ends of a display apparatus that is installed on a door of a refrigerator, according to an exemplary embodiment of the present invention.
Figure 11:
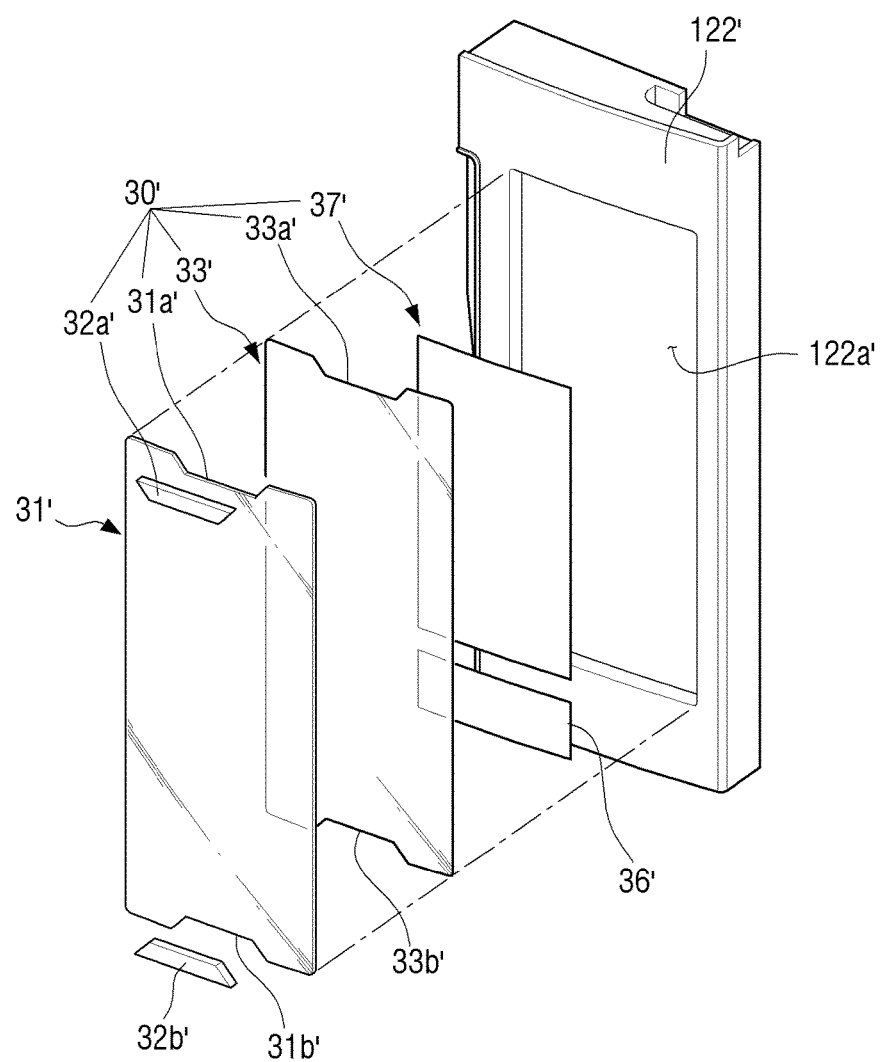
FIG. 11 is an exploded perspective view of the display apparatus of FIG. 10.

FIG. 10 illustrates proximity sensors that are disposed at upper and lower ends of a display apparatus 30', i.e., a perspective view of the display apparatus 30' that is installed on a door of a refrigerator, according to an exemplary embodiment of the present invention. FIG. 11 is an exploded perspective view of the display apparatus 30' of FIG. 10.

Most elements of the display apparatus 30' shown in FIGS. 10 and 11 are the same as those of the display apparatus 30 described above, and thus merely different elements of the display apparatus 30' from those of the display apparatus 30 will now be described.

Referring to FIG. 10, the display apparatus 30' according to the present exemplary embodiment may be arranged on a door 122' of a refrigerator. In this case, first and second support holes 32a' and 32b' including the proximity sensors (not shown) may be disposed at the upper and lower ends of the display apparatus 30'.

Referring to FIG. 11, a housing groove 122a' that is formed in a front surface of the door 122' may be installed in the display apparatus 30'. The display apparatus 30' may be configured to be equal to the display apparatus 30 of FIG. 3. However, grooves 31a', 31b', 33a', and 33b' in which the first and second support holes 32a' and 32b' including the proximity sensors (not shown) are disposed may be respectively formed in upper and lower ends of a transparent protection layer 31' and a half mirror layer 33'.

In this case, front surfaces of the first and second support holes 32a' and 32b' may have the same colors as a color of the door 122' or a color of a printing layer. As described above, the colors of the first and second support holes 32a' and 32b' are determined in consideration of a whole design of the refrigerator and thus may harmonize with a design of the door 122' or the display apparatus 30'.

Reference numeral 36' is a touch key in FIG. 11, and a printing layer and a transparent electrode layer of the display apparatus 30' are omitted in FIG. 11.

Refrigerators having various types of designs are disclosed in FIGS. 12 through 20, and a display apparatus 30 installed in the refrigerators may be arranged with objects (e.g., a grip) formed at the refrigerators. In addition, an upper end 30a and a lower end 30b of the display apparatus 30 mentioned in FIGS. 12 through 20 may be respectively the same as the upper end 31a and the lower end 31b of the transparent protection layer 31.

Figure 12:
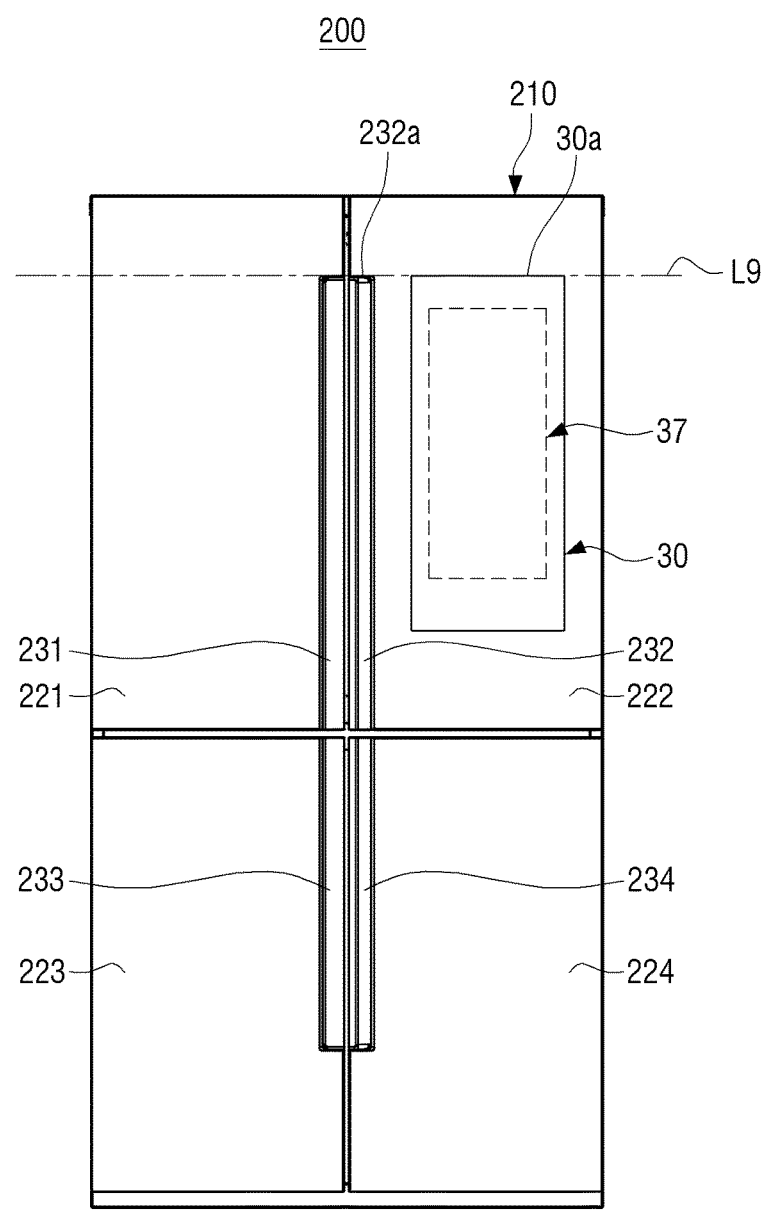
FIGS. 12 through 20 respectively illustrate positions of a display apparatus that is arranged according to various designs of a refrigerator, according to exemplary embodiments of the present invention.
Figure 13:
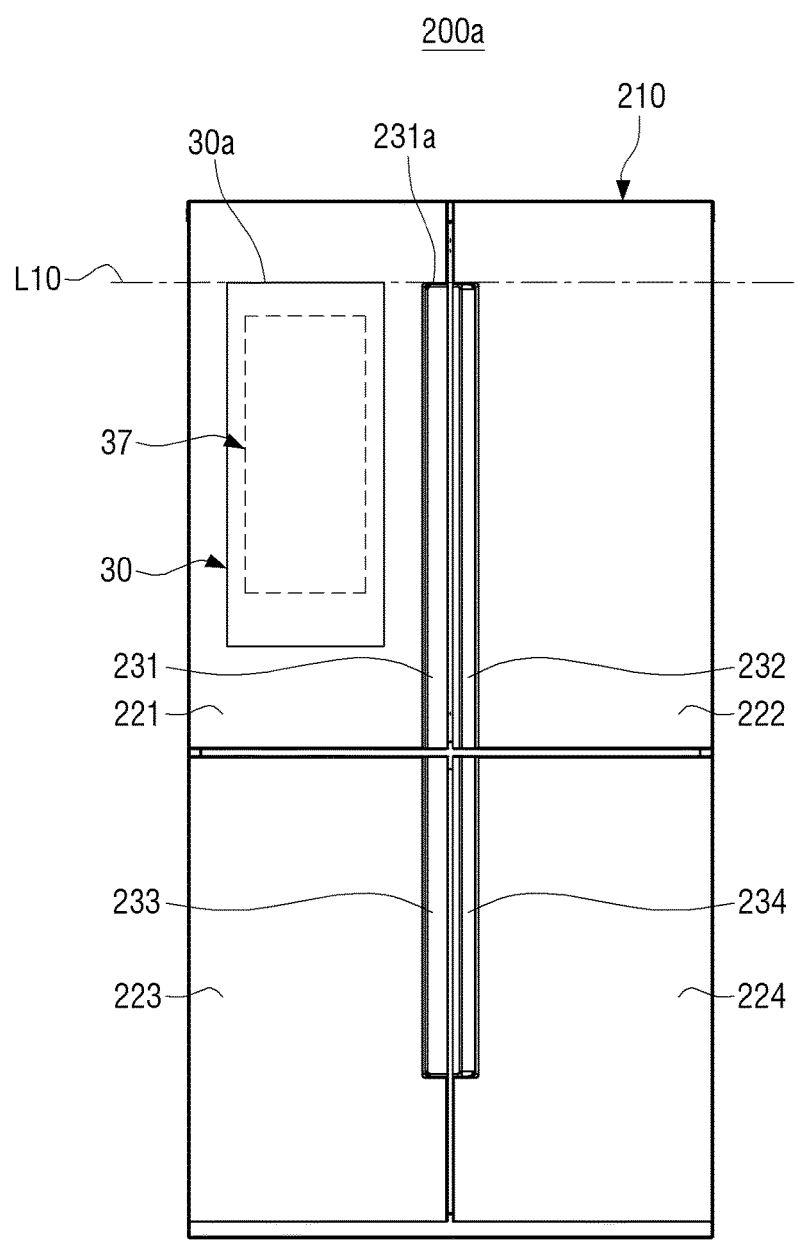

Like the refrigerator 100 of FIG. 7 described above, refrigerators 200 and 200a respectively illustrated in FIGS. 12 and 13 may each include four doors 221, 222, 223, and 224 installed on a front surface of a main body 210 and four grips 231, 232, 233, and 234 installed at the doors 221, 222, 223, and 224. However, the refrigerators 200 and 200a respectively illustrated in FIGS. 12 and 13 do not include a dispenser 150 and thus are different from the refrigerator 100 of FIG. 7.

Referring to FIG. 12, the display apparatus 30 may be installed on an upper right door 222 of the refrigerator 200. In this case, the display apparatus 30 may be disposed in a position arranged with objects included in the main body 210. In other words, the display apparatus 30 may be arranged so as to enable an upper end 30a of the display apparatus 30 to be positioned on a ninth virtual straight line L9 along with an upper end 232a of the grip 232 of the upper right door 222.

Referring to FIG. 13, the display apparatus 30 may be installed on an upper left door 221 of the refrigerator 200a. In this case, the display apparatus 30 may be arranged so as to enable an upper end 30a of the display apparatus 30 to be positioned on a tenth virtual straight line L10 along with an upper end 231a of the grip 231 of the upper left door 221.

Figure 14:
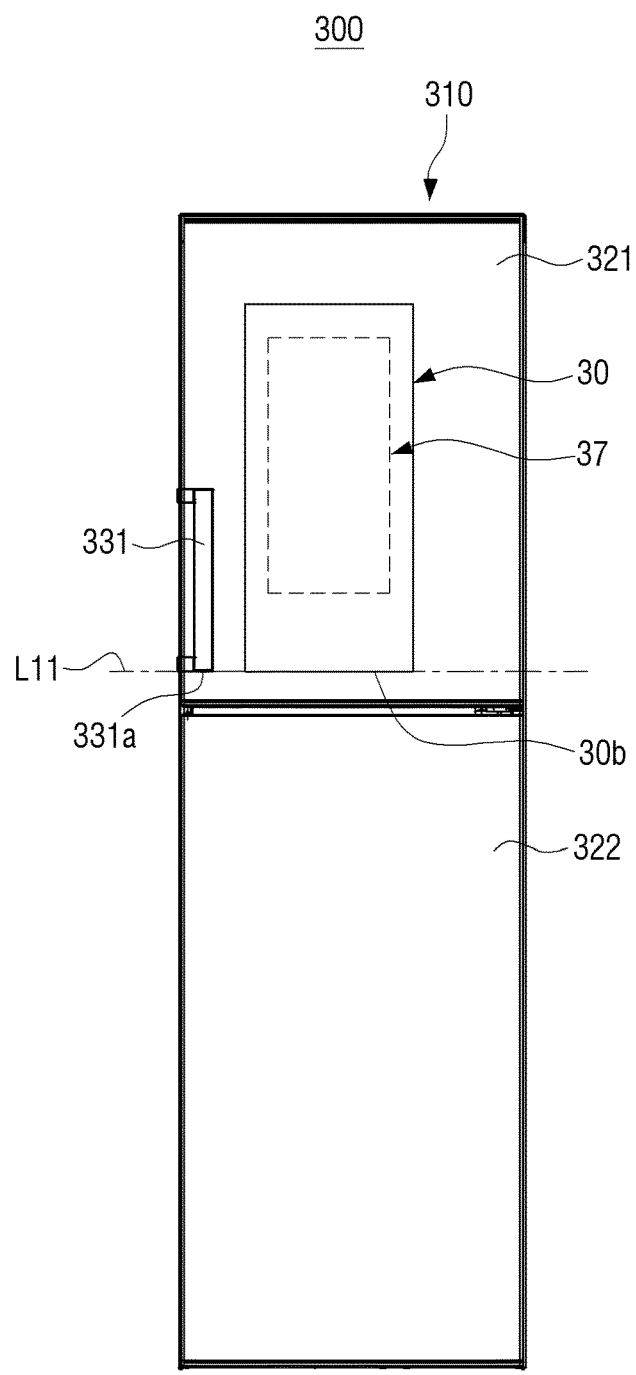
Figure 15:
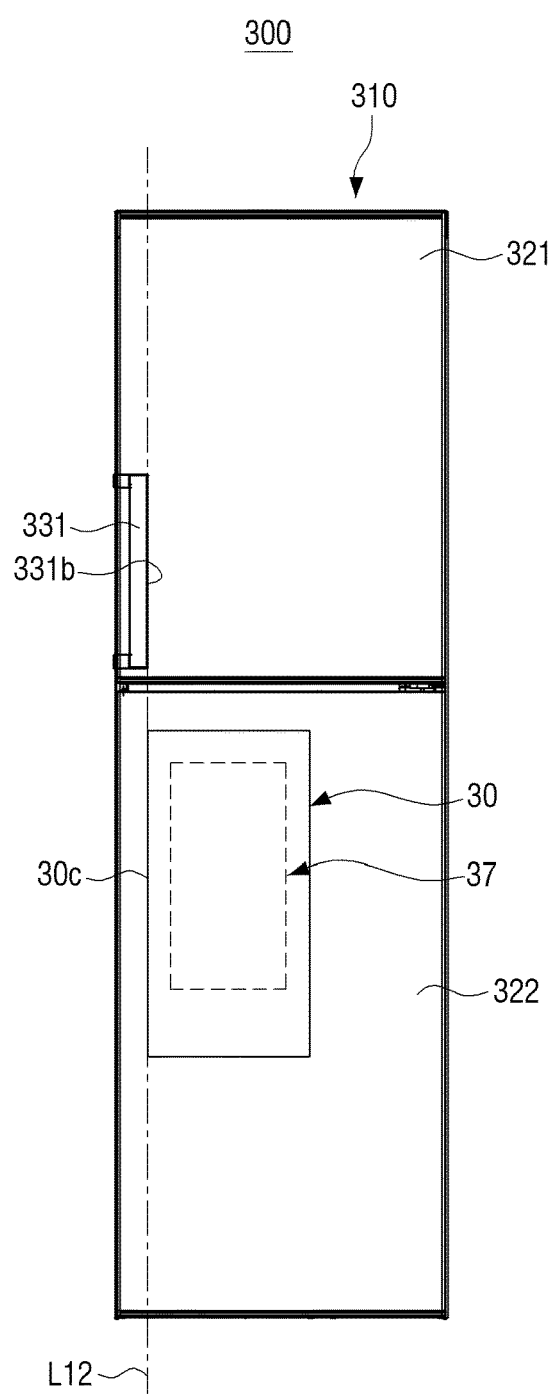

Differently from the refrigerators 200 and 200a of FIGS. 12 and 13, each of refrigerators 300 and 300a respectively illustrated in FIGS. 14 and 15 may include two doors 321 and 322 installed at upper and lower parts of a front surface of a main body 210. In this case, the upper door 321 includes a grip 331 installed on a lower left side. Here, upper and lower widths of the upper door 321 may be smaller than or equal to upper and lower widths of the lower door 322.

Referring to FIG. 14, the display apparatus 30 may be installed on the upper door 321 of the refrigerator 300. In this case, the display apparatus 30 may be arranged so as to enable a lower end 30b of the display apparatus 30 to be positioned on an eleventh virtual straight line L11 along with a lower end 331a of the grip 331 of the upper door 321.

Referring to FIG. 15, the display apparatus 30 may be installed on the lower door 32 of the refrigerator 300a. In this case, the display apparatus 30 may be arranged so as to enable a left end 30c of the display apparatus 30 to be positioned on a twelfth virtual straight line L12 along with a right end 331b of the grip 331 of the upper door 321.

Figure 16:
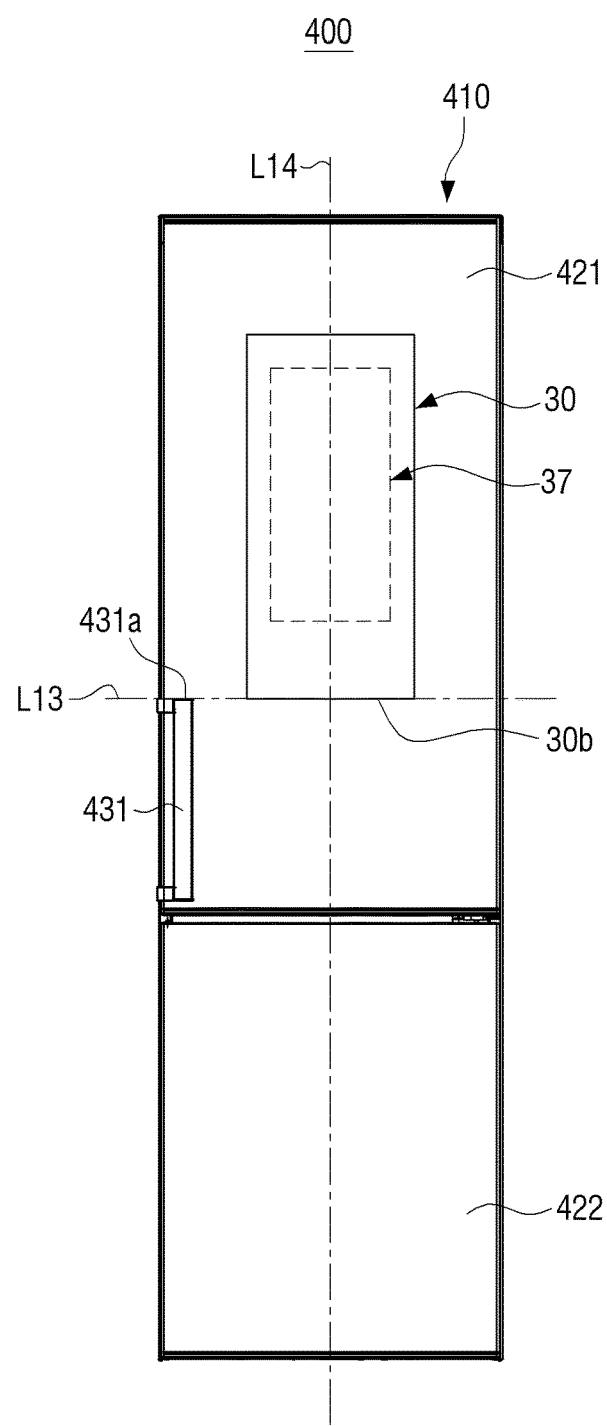
Figure 17:
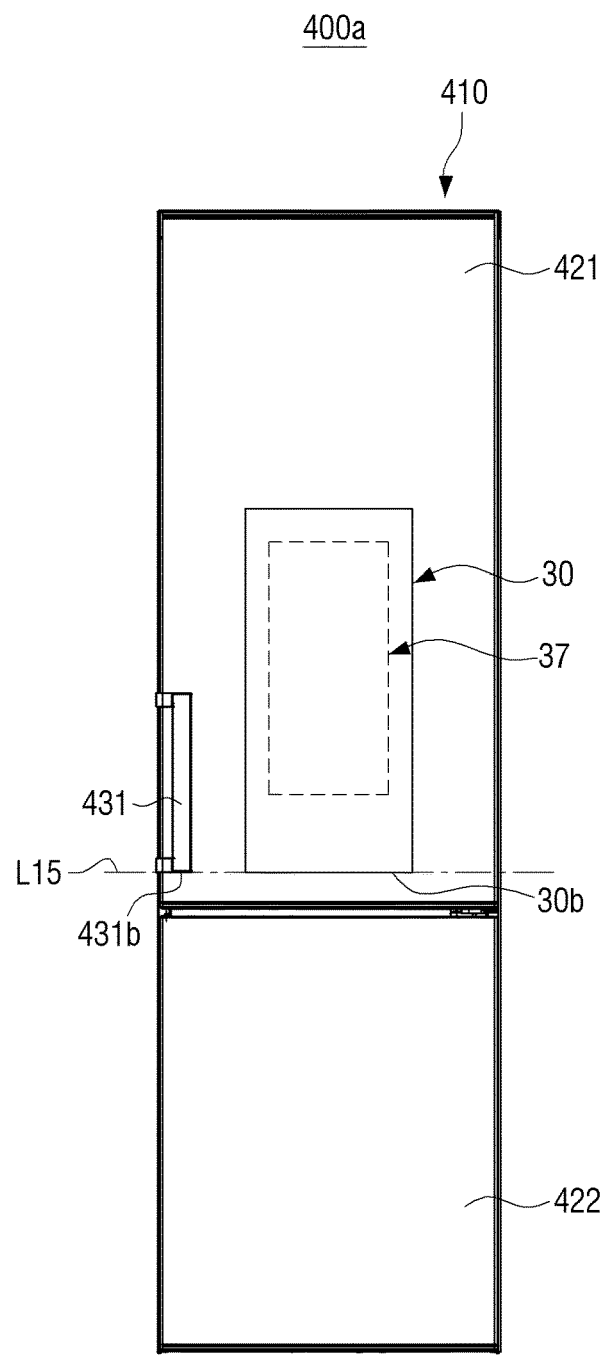
Figure 18:
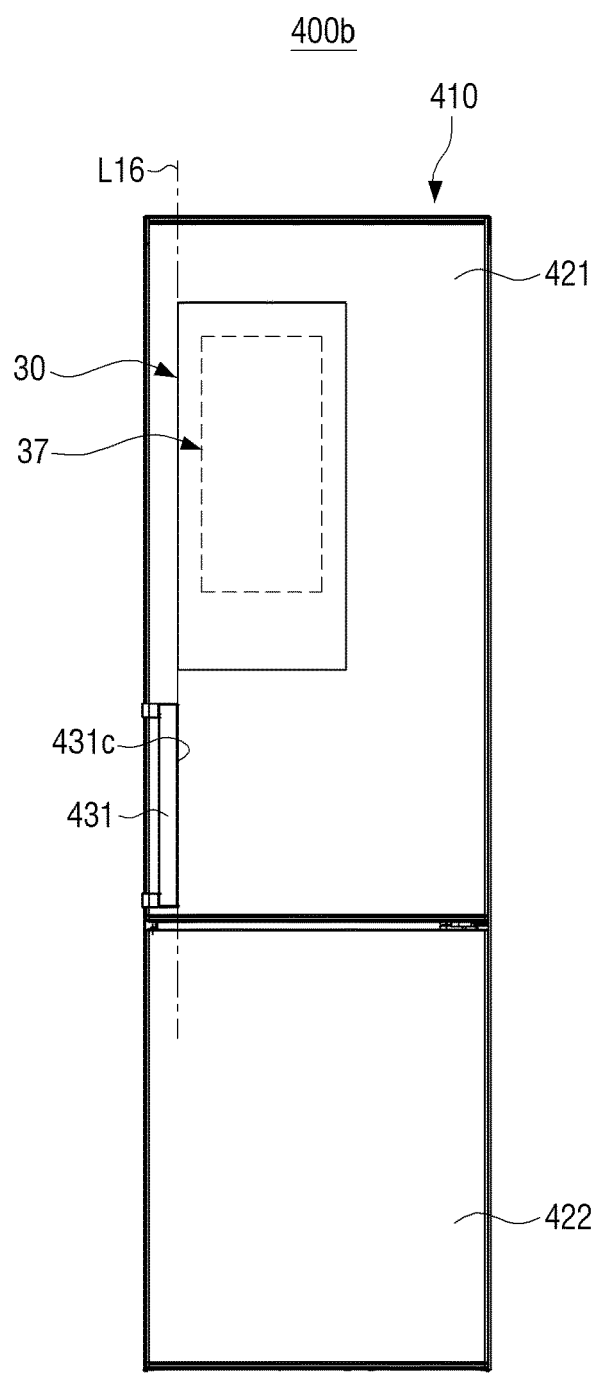

Like the refrigerators 300 and 300a illustrated in FIGS. 14 and 15, each of refrigerators 400, 400a, and 400b respectively illustrated in FIGS. 16 through 18 includes two doors 421 and 422 installed at upper and lower parts of a front surface of a main body 410. In this case, the upper door 421 may include a grip 431 on a left side thereof. However, upper and lower widths of the upper door 421 may be wider than upper and lower widths of the lower door 422.

Referring to FIG. 16, the display apparatus 30 may be installed on the upper door 421 of the refrigerator 400. In this case, the display apparatus 30 may be arranged so as to enable a lower end 30b of the display apparatus 30 to be positioned on a thirteenth virtual straight line L13 along with an upper end 431a of a grip 431 of the upper door 421. In this case, the display apparatus 30 may be arranged so as to enable a vertical center line of the display apparatus 30 to correspond to a virtual fourteenth center line L14 corresponding to a vertical center line of the upper door 421.

Referring to FIG. 17, the display apparatus 30 may be installed on the upper door 421 of the refrigerator 400a. In this case, the display apparatus 30 may be arranged so as to enable the lower end 30b of the display apparatus 30 to be positioned on a fifteenth virtual straight line L15 along with a lower end 431b of the grip 431 of the upper door 421.

Referring to FIG. 18, the display apparatus 30 may be installed on the upper door 421 of the refrigerator 400b. In this case, the display apparatus 30 may be arranged so as to enable a left end of the display apparatus 30 to be positioned on a sixteenth virtual straight line L16 along with a right end 431c of the grip 431 of the upper door 421.

Figure 19:
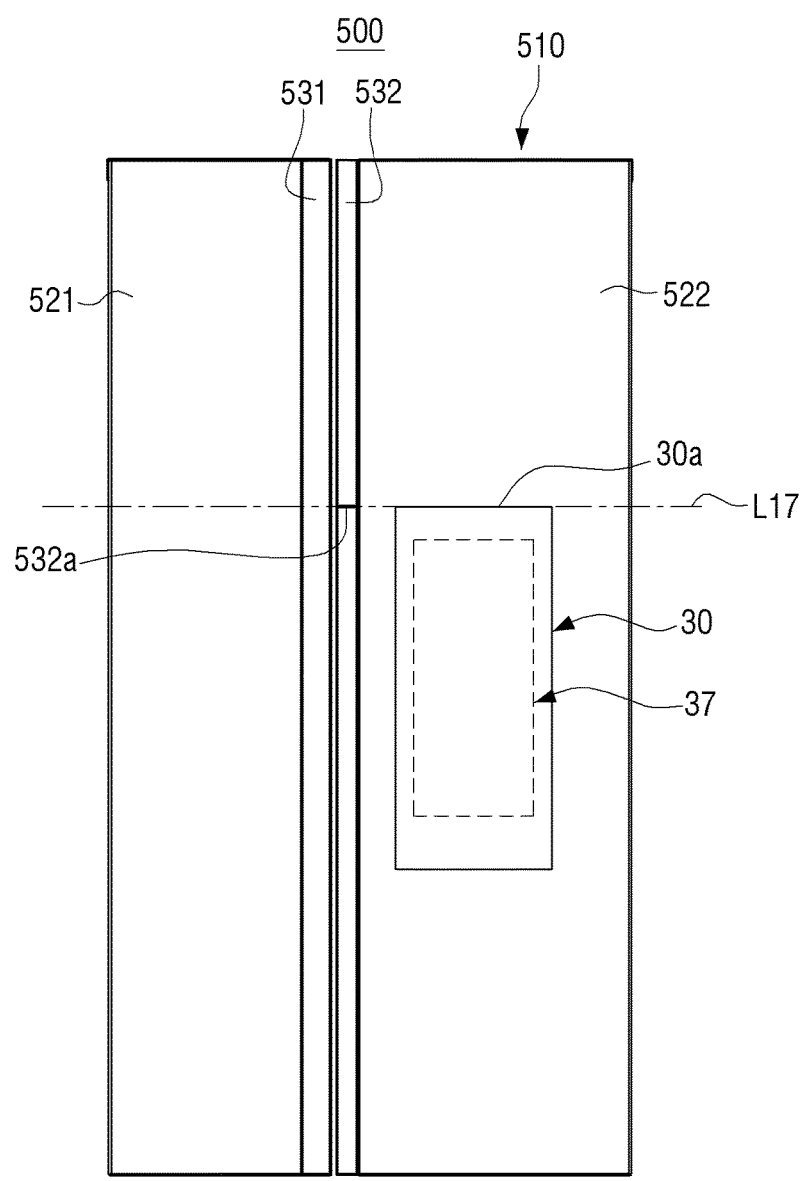
Figure 20:
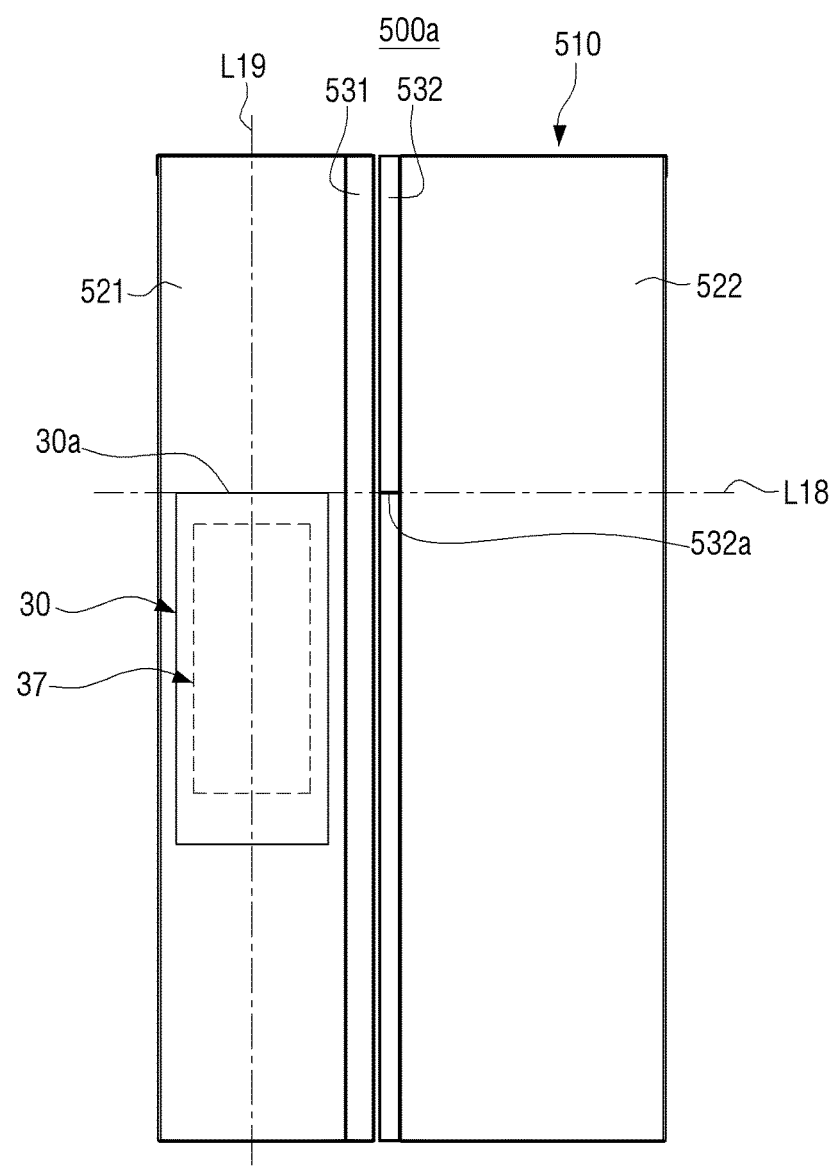

Like the refrigerators 300, 300a, 400, 400a, and 400b illustrated in FIGS. 14 through 18, each of refrigerators 500 and 500a respectively illustrated in FIGS. 19 and 20 includes two doors 521 and 522 installed on a front surface of a main body 510. However, the two doors 521 and 522 are disposed on left and right sides. Here, left and right widths of the left door 521 may be narrower than left and right widths of the right door 522.

Referring to FIG. 19, the display apparatus 30 may be installed on the right door 522 of the refrigerator 500. In this case, the display apparatus 30 may be arranged so as to enable an upper end 30a of the display apparatus 30 to be positioned on a seventeenth virtual straight line L17 along with a straight line 532a horizontally formed at a grip 532 of the right door 522.

The display apparatus 30 may be arranged based on a figure such as a line displayed on a part of the grip 532 not on upper, lower, left, and right ends of the grip 532 as described above.

Referring to FIG. 20, the display apparatus 30 may be installed on a left door 521 of the refrigerator 500a. In this case, the display apparatus 30 may be arranged so as to enable an upper end 30a of the display apparatus 30 to be positioned on an eighteenth virtual straight line L18 along with a straight line 532a displayed at the grip 532 of the right door 522. Here, the display apparatus 30 may be arranged so as to enable a vertical center line of the display apparatus 30 to correspond to a nineteenth virtual center line L19 corresponding to a vertical center line of the left door 521.

Various exemplary embodiments of the present invention have been individually described above but may not be necessarily singly embodied. Structures and operations of the exemplary embodiments may be combined with at least one other exemplary embodiments.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A home appliance comprising:
a main body including at least one object on a surface of the main body; and
a display apparatus installed on the surface of the main body,
wherein the display apparatus comprises
a display,
a transparent protection layer disposed on a front surface of the display and having a wider area than an area of the display,
a half mirror layer adhering onto a back surface of the transparent protection layer, and a printing layer formed on a back surface of the half mirror layer and covering the display, and wherein a side of the display apparatus and a side of the at least one object are on a virtual straight line so that the side of the display apparatus is aligned with the side of the at least one object.

2. The home appliance of claim 1, wherein a color of the half mirror layer is equal or similar to a color of the main body.

3. The home appliance of claim 2, wherein the half mirror layer has light transmissivity between 65% and 85%.

4. The home appliance of claim 1, wherein a color of a graphical user interface (GUI) background displayed in an image display area of the display when the display is turned on, a color of the image display area of the display when the display is turned off, and a color of the printing layer are equal to one another.

5. The home appliance of claim 1, wherein the half mirror layer is formed in a size equal to a size of the transparent protection layer.

6. The home appliance of claim 1, wherein the printing layer includes
a first area configured to expose an image display area of the display, and
a second area configured to exclude the first area, and
the second area comprises a touch area where a capacitive touch key is disposed on a back surface of the printing layer.

7. The home appliance of claim 6, wherein masking parts are formed in the touch area,
the masking parts indicate at least one image or symbol, and
a light source is disposed around the capacitive touch key so as to diffuse light to the masking parts.

8. The home appliance of claim 1, wherein the half mirror layer is a nonconductive film, and the home appliance further comprises:
a transparent electrode layer disposed between the half mirror layer and the display so as to receive a touch input of a user and transmit the touch input to a controller.

9. A home appliance comprising:
a main body including a refrigerator compartment, a freezer compartment, a door, and a grip, the door being configured to open and close the refrigerator compartment or the freezer compartment, and the grip being configured to open and close the door; and
a display apparatus installed on the door,
wherein a part of the display apparatus is arranged with a part of the grip,
the display apparatus comprises includes
a display,
a transparent protection layer disposed on a front surface of the display, the transparent protection layer having a wider area than an area of the display,
a half mirror layer adhering onto a back surface of the transparent protection layer, and
a printing layer formed on a back surface of the half mirror layer, the printing layer covering the display,
a color of the half mirror layer is equal or similar to a color of the main body, and
a color of a graphical user interface (GUI) background displayed in an image display area of the display when the display is turned on, a color of the image display area of the display when the display is turned off, and a color of the printing layer are equal to one another.

10. The home appliance of claim 9, wherein the main body further comprises an additional door on which a dispenser is installed, and
another part of the display apparatus is arranged with a part of the dispenser.

* * * * *